United States Patent
Fan (10) Patent No.: US 11,184,587 B2
(45) Date of Patent: Nov. 23, 2021

(54) IMAGE SURVEILLANCE SYSTEM, LOCAL AREA NETWORK SYSTEM AND ESTABLISHING METHOD OF THE SAME

(71) Applicant: Sigmastar Technology Ltd., Xia'men (CN)

(72) Inventor: Jin-Hua Fan, Shenzhen (CN)

(73) Assignee: SIGMASTAR TECHNOLOGY LTD., Xia'men (CN)

( * ) Notice: Subject to any disclaimer, the term of this patent is extended or adjusted under 35 U.S.C. 154(b) by 0 days.

(21) Appl. No.: 16/885,534

(22) Filed: May 28, 2020

(65) Prior Publication Data

US 2020/0382369 A1    Dec. 3, 2020

(30) Foreign Application Priority Data

May 31, 2019    (CN) .......................... 201910471167.9

(51) Int. Cl.
*H04L 12/721*    (2013.01)
*H04L 12/24*    (2006.01)
(Continued)

(52) U.S. Cl.
CPC ......... *H04N 7/181* (2013.01); *H04L 41/0816* (2013.01); *H04L 41/12* (2013.01);
(Continued)

(58) Field of Classification Search
USPC ........................................................ 370/254
See application file for complete search history.

(56) References Cited

U.S. PATENT DOCUMENTS 9,462,464 B2    10/2016    Patil et al.
9,998,665 B2 *   6/2018    Waltermann ....... H04N 5/23245
(Continued)

FOREIGN PATENT DOCUMENTS

CN    101442455 B    2/2011
TW    201134167 A    10/2011
(Continued)

OTHER PUBLICATIONS

OA letter of the counterpart TW application (appl. No. 108121145) dated Feb. 7, 2020. Summary of the OA letter (Feb. 7, 2020): Claims 1~20 are rejected as being unpatentable over the disclosure of the cited reference 1 (TW201134167A, also published as US2011231526A1) and the cited reference 2 (TWM478846).

(Continued)

*Primary Examiner* — Jude Jean Gilles
(74) *Attorney, Agent, or Firm* — WPAT, PC (57) ABSTRACT

The present disclosure discloses an image surveillance system that includes an image recording host and IP cameras. Each of the IP cameras includes a storage circuit that stores identification information including identification codes, a communication circuit that performs network communication and a processing circuit. The processing circuit executes software and firmware executable commands to execute an image surveillance system establishing method that includes the steps outlined below. The other IP cameras are identified according to the identification information by using the communication circuit to perform network connection thereto to form a local area network that only includes the IP cameras. Within the local area network, a connection path is set to connect the image recording host either indirectly through at least one of the other IP cameras or directly. An image stream is transmitted to the image recording host (Continued)

through the connection path by using the communication circuit.

20 Claims, 5 Drawing Sheets

(51) Int. Cl.
    *H04N 7/18*     (2006.01)
    *H04N 5/247*     (2006.01)
    *H04N 21/426*     (2011.01)
    *H04L 12/761*     (2013.01)
    *H04L 12/753*     (2013.01)

(52) U.S. Cl.
    CPC ............ *H04L 41/22* (2013.01); *H04L 45/123* (2013.01); *H04L 45/16* (2013.01); *H04L 45/48* (2013.01); *H04N 5/247* (2013.01); *H04N 7/18* (2013.01); *H04N 21/42684* (2013.01)

(56) References Cited

U.S. PATENT DOCUMENTS

| | | | | |
|---|---|---|---|---|
| 10,288,420 | B2* | 5/2019 | Shih | G06T 7/70 |
| 10,496,880 | B2* | 12/2019 | Ye | G06K 9/4642 |
| 2003/0151662 | A1* | 8/2003 | Bopp | H04N 7/181 |
| | | | | 348/139 |
| 2006/0050149 | A1* | 3/2006 | Lang | H04N 7/181 |
| | | | | 348/148 |
| 2006/0170773 | A1* | 8/2006 | Rye | G08B 13/19645 |
| | | | | 348/159 |
| 2008/0278582 | A1* | 11/2008 | Chung | H04N 7/18 |
| | | | | 348/159 |
| 2011/0231526 | A1 | 9/2011 | Hsieh | |
| 2014/0376448 | A1* | 12/2014 | Kao | H04W 76/11 |
| | | | | 370/315 |
| 2015/0138365 | A1 | 5/2015 | Hsieh et al. | |

FOREIGN PATENT DOCUMENTS

| | | |
|---|---|---|
| TW | M478846 U | 5/2014 |
| TW | I504274 B | 10/2015 |
| TW | I654864 B | 3/2019 |

OTHER PUBLICATIONS

OA letter of the counterpart TW application (appl. No. 108121145) dated Mar. 30, 2020. Summary of the OA letter (Mar. 30, 2020): Claims 1~20 are rejected as being unpatentable over the disclosure of the cited reference 1 (TW201134167A, also published as US2011231526A1) and the cited reference 2 (TWM478846).

* cited by examiner

IMAGE SURVEILLANCE SYSTEM, LOCAL AREA NETWORK SYSTEM AND ESTABLISHING METHOD OF THE SAME

BACKGROUND OF THE INVENTION

1. Field of the Invention

The present disclosure relates to an image mage surveillance system, a local area network system and an establishing method of the same.

2. Description of Related Art

In general, image retrieving devices for surveillance, e.g. IP cameras, transmit retrieved images in real time to a control terminal, e.g. an image recording host, in the form of image streams to accomplish the real-time surveillance mechanism.

However, the arrangement of the image retrieving devices in current surveillance system is limited, in which all of the image retrieving devices have to be directly connected to the image recording host through either a wireless network or a wired network. As a result, the image stream transmission and the physical distribution of the image retrieving devices are not elastic.

SUMMARY OF THE INVENTION

In consideration of the problem of the prior art, an object of the present disclosure is to provide an image mage surveillance system, a local area network system and an establishing method of the same to provide an elastic way to establish the image mage surveillance system.

The present disclosure discloses an image surveillance system that includes an image recording host and a plurality of IP cameras. Each of the IP cameras includes a storage circuit, a communication circuit and a processing circuit. The storage circuit is configured to store identification information of all the IP cameras that includes a plurality of identification codes, wherein each of the IP cameras only corresponds to one of the plurality of identification codes. The communication circuit is configured to perform network communication. The processing circuit is electrically coupled to the storage circuit and the communication circuit and is configured to execute software and firmware executable commands to execute an image surveillance system establishing method that includes the steps outlined below. For any one of the IP cameras, the other IP cameras are identified according to the identification information by using the communication circuit to perform network connection thereto to form a local area network that only includes the plurality of IP cameras. Within the local area network, a connection path is set to either directly connect the image recording host or indirectly connect the image recording host through at least one of the other IP cameras by using the communication circuit. An image stream is transmitted to the image recording host through the connection path by using the communication circuit.

The present disclosure also discloses an image surveillance system establishing method that includes the steps outlined below. Identification information that includes a plurality of identification codes of all of a plurality of IP cameras is stored by a storage circuit of each of the IP cameras, wherein each of the IP cameras only corresponds to one of the plurality of identification codes. For any one of the IP cameras, the other IP cameras are identified by a processing circuit of each of the IP cameras according to the identification information of each of the IP cameras by using a communication circuit to perform network connection thereto to form a local area network that only includes the plurality of IP cameras. Within the local area network, a connection path is set by the processing circuit to either directly connect the image recording host or indirectly connect the image recording host through at least one of the other IP cameras by using the communication circuit. An image stream is transmitted by the processing circuit to the image recording host through the connection path by using the communication circuit.

The present disclosure further discloses a local area network system that includes a plurality of IP cameras. Each of the IP cameras includes a storage circuit, a communication circuit and a processing circuit. The storage circuit is configured to store identification information that includes a plurality of identification codes of all the IP cameras, wherein each of the IP cameras only corresponds to one of the plurality of identification codes. The communication circuit is configured to perform network communication. The processing circuit is electrically coupled to the storage circuit and the communication circuit and is configured to execute software and firmware executable commands to execute an image surveillance system establishing method that includes, for any one of the IP cameras, identifying the other IP cameras according to the identification information through the communication circuit to perform network connection thereto to form a local area network that only comprises the plurality of IP cameras.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide an image mage surveillance system, a local area network system and establishing method of the same to provide an elastic way to construct the image mage surveillance system.

Figure 1:
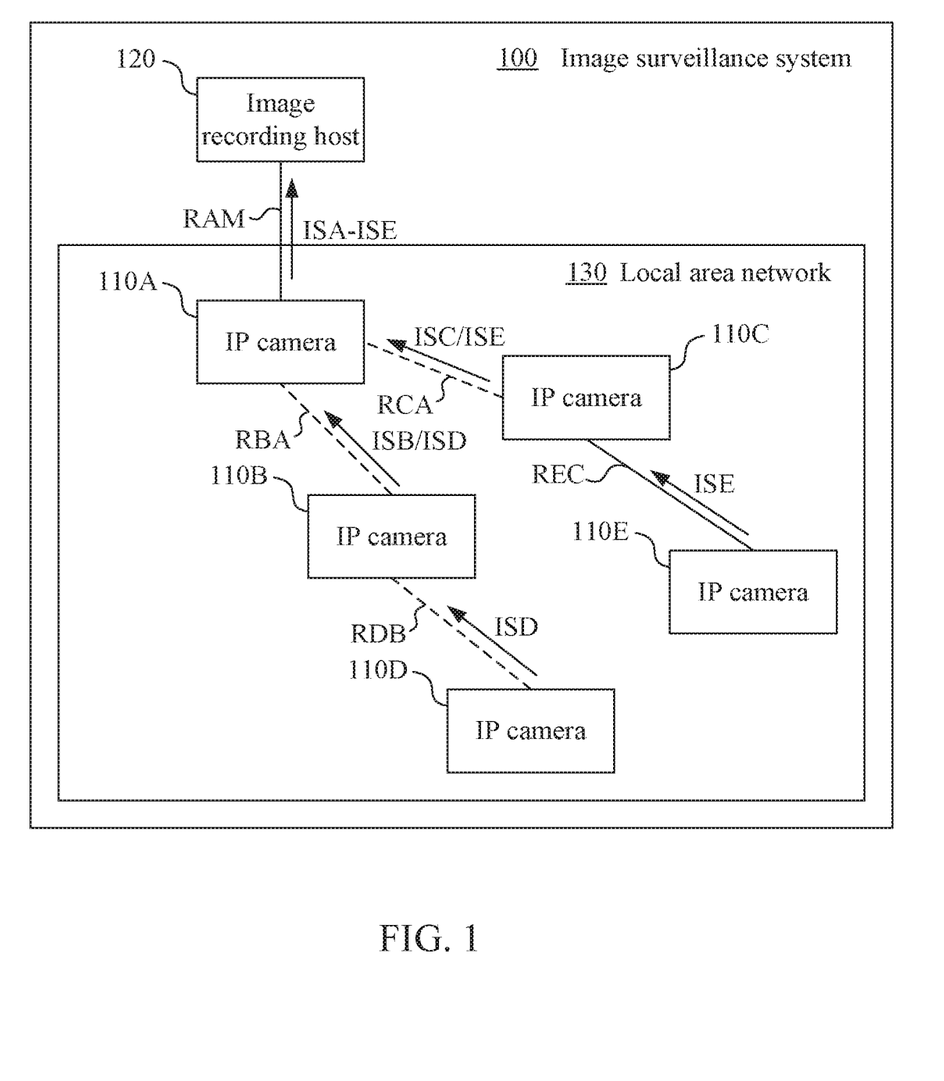
FIG. 1 is a block diagram of an image surveillance system in an embodiment of the present invention.

Reference is now made to FIG. 1. FIG. 1 is a block diagram of an image surveillance system 100 in an embodiment of the present invention. The image surveillance system 100 includes a plurality of IP cameras 110A-110E and an image recording host 120.

In an embodiment, the IP cameras 110A-110E are configured to perform image retrieving on the environment and generate image streams ISA-ISE. The IP cameras 110A-

110E are connected together in either wired or wireless form to form a local area network 130 that only includes the IP cameras 110A-110E.

Further, the local area network 130 formed by the IP cameras 110A-110E is connected to the image recording host 120 in either wired or wireless form such that the IP cameras 110A-110E are able to transmit the retrieved image streams ISA-ISE to the image recording host 120. The image recording host 120 further stores and processes the image streams ISA-ISE.

It is appreciated that five IP cameras 110A-110E are exemplarily illustrated in FIG. 1. However, the number of the IP cameras are not limited by the number illustrated in FIG. 1 and can be any number larger than 1.

Figure 2:
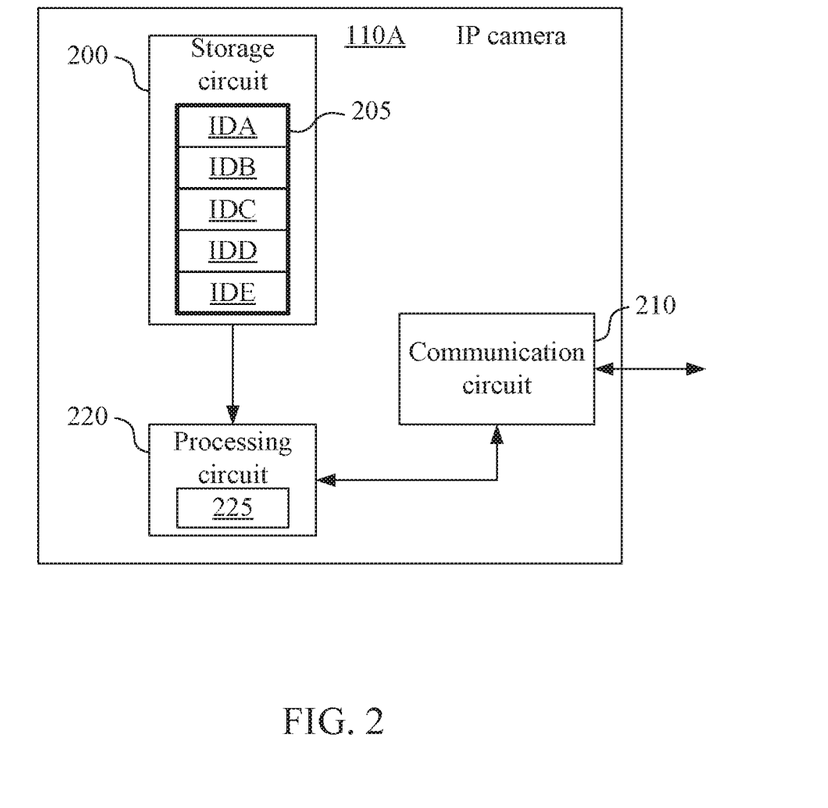
FIG. 2 is a block diagram of the IP camera of the image surveillance system in an embodiment of the present invention.

The configuration of each of the IP cameras 110A-110E is described in detail in accompany with FIG. 2 in the following paragraphs. In FIG. 2, the IP camera 110A is used as an example. The IP cameras 110B-110E may include the same configuration as the IP camera 110A and are not described herein.

Reference is now made to FIG. 2. FIG. 2 is a block diagram of the IP camera 110A of the image surveillance system 100 in an embodiment of the present invention. As illustrated in FIG. 2, the IP camera 110A includes a storage circuit 200, a communication circuit 210 and a processing circuit 220.

The storage circuit 200 can be implemented by any storage device configured to store data, such as, but not limited to a random access memory (RAM), a read only memory (ROM), or a hard drive. The storage circuit 200 is configured to store identification information 205 that includes a plurality of identification codes IDA-IDE of all of the IP cameras 110A-110E. Each of the IP cameras 110A-110E only corresponds to one of the plurality of identification codes IDA-IDE. In the present embodiment, the identification code IDA corresponds to the IP camera 110A. The identification code IDB corresponds to the IP camera 110B. The identification code IDC corresponds to the IP camera 110C. The identification code IDD corresponds to the IP camera 110D. The identification code IDE corresponds to the IP camera 110E.

The communication circuit 210 can be implemented by any communication device that has the ability to access network, such as, but not limited to the communication devices that support WiFi or long term evolution (LTE) communication standards. The communication circuit 210 is configured to perform network communication through a wireless network or a wired network.

The processing circuit 220 is electrically coupled to the storage circuit 200 and the communication circuit 210. The processing circuit 220 can include one or more than one microprocessors and is configured to execute software and firmware executable commands 225 to perform the function of the IP camera 110A.

More specifically, the processing circuit 220 can retrieve software and firmware executable commands 225 from a storage module (not illustrated) in the IP camera 110A that includes such as, but not limited to firmware/driver of the hardware modules including the storage circuit 200 and the communication circuit 210 and other related commands to operate and control the hardware modules including the storage circuit 200 and the communication circuit 210. The processing circuit 220 can thus operate and control the hardware modules including the storage circuit 200 and the communication circuit 210 to form the image surveillance system 100 together with the other IP cameras 110B-110E.

The process of forming the image surveillance system 100 having the IP cameras 110A-110E is described in the following paragraphs by using the IP camera 110A as an example in accompany with FIG. 1 and FIG. 2.

At first, by using the communication circuit 210, the processing circuit 220 of the IP camera 110A identifies the other IP cameras 110B-110E according to the identification information 205 to perform network connection thereto to form a local area network 130 that only includes the IP cameras 110A-110E.

In an embodiment, the retrieving of the identification information 205 is selectively performed by manual input of the user. In another embodiment the retrieving of the identification information 205 is selectively performed by automatic matching process. The automatic matching process is described below.

In an embodiment, the storage circuit 200 of the IP camera 110A stores a self-owned identification code IDA. By using the communication circuit 210, the processing circuit 220 connects to the other IP cameras 110B-110E through wired paths and broadcasts the self-owned identification code IDA. At the same time, by using the communication circuit 210, the processing circuit 220 receives the identification codes IDB-IDE of the other IP cameras 110B-110E to exchange the identification codes.

After exchanging the identification codes, the processing circuit 220 of the IP camera 110A stores the identification codes IDB-IDE of the other IP cameras 110B-110E and the self-owned identification code IDA as the identification information 205 in the storage circuit 200. Identically, the IP cameras 110B-110E store the identification information 205 that includes the identification codes IDA-IDE in the corresponding storage circuits after exchanging the identification codes.

In an embodiment, each of the identification codes IDA-IDE of the IP cameras 110A-110E is a media access control (MAC) address or a chip identification code.

After the automatic matching process is finished, the IP cameras 110A-110E are disconnected from the wired paths. Since the storage circuit 200 already stores the identification information 205, the processing circuit 220 of the IP camera 110A can identify the IP cameras 110B-110E according to the identification information 205 when the IP cameras 110A-110E are connected again. Further, the IP cameras 110B-110E can also identify each other to form the local area network 130 that only includes the IP cameras 110A-110E.

It is appreciated that the stage of identifying the IP camera 110A-110E to form the local area network 130 can be performed by connecting the IP camera 110A-110E through the communication circuit 210 in either wired or wireless form. The form of the connection is not limited.

For example, in such a stage, if the IP camera 110E is isolated from the other IP cameras 110A-110D due to a presence of a wall such that the wireless signal is not stable, the IP camera 110E can be connected to one of the IP cameras 110A-110D that is physically closest to the IP camera 110E, e.g. IP camera 110C, by using a wired connection. The other IP cameras 110A-110D can be connected to each other in the wireless form.

Subsequently, the processing circuit 220 of the IP camera 110A can set a connection path within the local area network to either directly connect the image recording host 120 or indirectly connect the image recording host 120 through at least one of the other IP cameras 110B-110E by using the communication circuit 210.

In an embodiment, the processing circuit 220 determines a path from the IP camera 110A to the image recording host 120 in the local area network 130 that either has the largest signal strength, the most stable signal strength or the shortest connection distance to set the path as the connection path. In an embodiment, the path having the largest signal strength is a path that has a highest value of the signal strength between a target IP camera to the image recording host 120. The path having the shortest connection distance is a path that includes the minimum number of relay IP cameras when a plurality of relay cameras are required to be used to connect the target IP camera and the image recording host 120.

In an embodiment, the connection path between the IP camera 110A and the image recording host 120 set by the processing circuit 220 is the one and only connection path for the IP camera 110A to be connected to the image recording host 120 in the local area network 130. As a result, the IP camera 110A does not need to be directly connected to every one of the IP cameras 110B-110E.

Similarly, the IP cameras 110B-110E can perform the setting of the connection paths to confirm their own connections to the image recording host 120 in the local area network 130. By setting the connection paths, the local area network 130 formed by the IP cameras 110A-110E has a topology of tree, instead of a topology of mesh that requires each two of the IP cameras to be connected together.

In an embodiment, at least one of the IP cameras 110A-110E is connected to the image recording host 120 in the wired form. Take FIG. 1 as an example, the IP camera 110A is connected to the image recording host 120 in the wired form. Under such condition, the IP cameras 110A-110E can perform an automatic output setting process to set an output for all the IP cameras 110A-110E.

Take the IP camera 110A as an example, the processing circuit 220 can determine that the IP camera 110A is an output IP camera. Since the path connected to the image recording host 120 in the wired form has the largest signal strength, the IP camera 110A that is directly connected to the image recording host 120 acts as the output IP camera.

The other IP cameras 110B-110E subsequently determines that the IP camera 110A is the output IP camera. When the connection paths of the IP cameras 110B-110E are determined, all the connection paths include the path between the IP camera 110A and the image recording host 120 (having the largest signal strength). As a result, all the IP cameras 110B-110E are connected to the image recording host 120 through the IP camera 110A.

As a result, the IP cameras 110A-110E that perform the automatic output and connection paths setting process are eventually connected to the image recording host 120 by using the configuration illustrated in FIG. 1. As shown in FIG. 1, the solid lines stand for the wired connection. The dashed lines stand for the wireless connection.

As illustrated in FIG. 1, the IP cameras 110B and 110C are respectively connected to the IP camera 110A through the wireless paths RBA and RCA and further connected to the image recording host 120 through the wired path RAM. As a result, the IP camera 110B is connected to the image recording host 120 through the connection path that includes the wireless path RBA and the wired path RAM to transmit the image stream ISB to the image recording host 120 through such a connection path. The IP camera 110C is connected to the image recording host 120 through the connection path that includes the wireless path RCA and the wired path RAM to transmit the image stream ISC to the image recording host 120 through such a connection path.

On the other hand, the IP camera 110D is connected to the IP camera 110B through the wired path RDB, connected to the IP camera 110A through the IP camera 110B and the wireless path RBA, and further connected to the image recording host 120 through the IP camera 110A and the wired path RAM. As a result, the IP camera 110D is connected to the image recording host 120 through the connection path that includes the wired path RDB, the wireless path RBA and the wired path RAM to transmit the image stream ISD to the image recording host 120 through such a connection path.

The IP camera 110E is connected to the IP camera 110C through the wired path REC, connected to the IP camera 110A through the IP camera 110C and the wireless path RCA, and further connected to the image recording host 120 through the IP camera 110A and the wired path RAM. As a result, the IP camera 110E is connected to the image recording host 120 through the connection path that includes the wired path REC, the wireless path RCA and the wired path RAM to transmit the image stream ISE to the image recording host 120 through such a connection path.

In another embodiment, none of the IP cameras 110A-110E is connected to the image recording host 120 in the wired form. As a result, the IP cameras 110A-110E determines the connection paths according to the wired and wireless paths among them and the wireless path between one of the IP cameras 110A-110E and the image recording host 120.

After the connection path is determined, the processing circuit 220 transmits the image stream ISA to the image recording host 120 through the connection path. Similarly, the IP cameras 110B-110 can transmit the image streams ISB-ISE to the image recording host 120 through the connection path set by using the method described above.

Based on the process described above, the image surveillance system 100 can first form a local area network 130 by using the automatic network establishing process through the use of the identification information 205 and is further connected to the image recording host 120. As a result, the image recording host 120 can be either configured as a device independent from the local area network 130 or configured as a part of the local area network 130. The establishing of the local area network 130 is not affected by the image recording host 120.

Further, the IP cameras 110A-110E can be connected in a topology of tree such that the distribution range of the IP cameras 110A-110E can be extended. The distribution of the space of the image surveillance system 100 can be more elastic.

Figure 3:
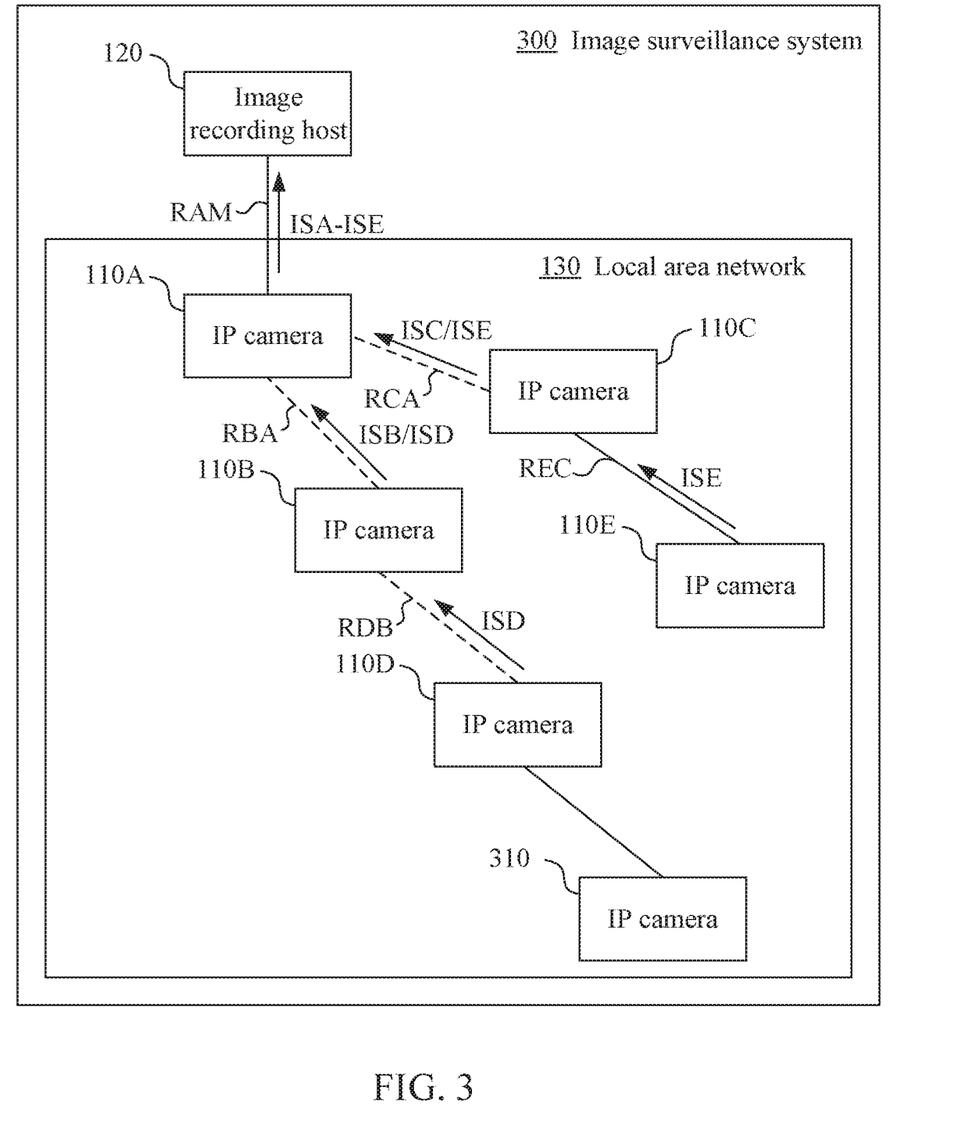
FIG. 3 is a block diagram of an image surveillance system in an embodiment of the present invention.

Reference is now made to FIG. 3. FIG. 3 is a block diagram of an image surveillance system 300 in an embodiment of the present invention.

As illustrated in FIG. 3, the image surveillance system 300 is identical to the image surveillance system 100 illustrated in FIG. 1 and includes the IP camera 110A-110E. However, in the present embodiment, the image surveillance system 300 further includes a newly added IP camera 310.

In an embodiment, when the newly added IP camera 310 is going to join the local area network 130 that includes the IP cameras 110A-110E, take the IP camera 110A as an example, the processing circuit 220 therein first determines that the IP camera 310 is connected to any one of the IP cameras 110A-110E, e.g. the IP camera 110D, in the wired form. Further, the processing circuit 220 of the IP camera 110A exchanges the identification codes (not illustrated) with the IP camera 310 by using the communication circuit 210, and stores the identification code of the newly added IP camera 310 in the identification information 205.

Similarly, the other IP cameras 110B-110E exchange the identification codes IDB-IDE with the IP camera 310 by using the same method and store the identification code of the IP camera 310 in the identification information 205.

After the process described above is performed, the IP camera 310 can be disconnected from the wired connection with the IP camera 110D and further be connected to the IP cameras 110A-110E again either in the wireless form or in the wired form to join the local area network 130. After the connection path is set, the IP camera 310 can be connected to the image recording host 120 and transmit the retrieved image stream to the image recording host 120.

Figure 4:
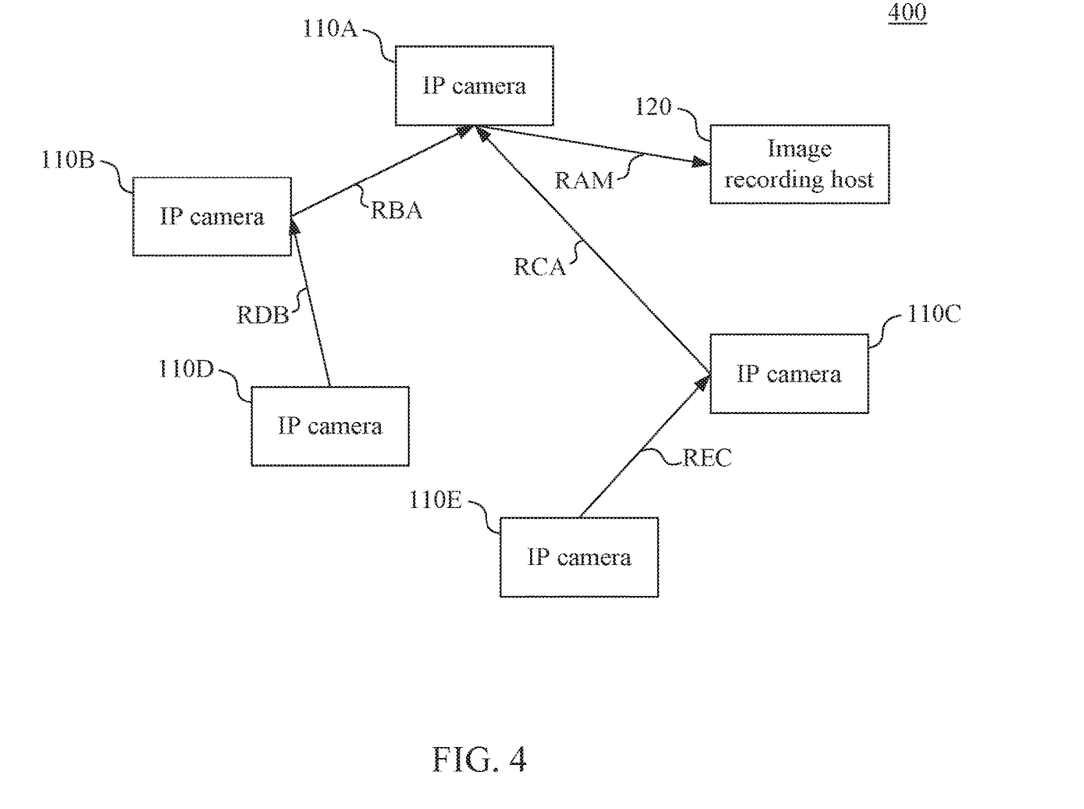
FIG. 4 is a user interface of the image surveillance system in an embodiment of the present invention.

Reference is now made to FIG. 4. FIG. 4 is a user interface 400 of the image surveillance system 100 in an embodiment of the present invention.

In an embodiment, the image recording host 120 can display the user interface 400 on a display device (not illustrated) included therein. As illustrated in FIG. 4, the user interface 400 includes a plurality of graphic blocks each corresponding to one of the IP cameras 110A-110E and the image recording host 120 in FIG. 1. The graphic blocks are arranged in a closed shape, such as but not limited to a ring shape.

A plurality of connection line sections are disposed among the graphic blocks that illustrate a network connection relation of the IP cameras 110A-110E in the local area network 130 and the network connection relation between the IP cameras 110A-110E and the image recording host 120. More specifically, the connection line sections correspond to the wired path RAM, the wireless path RBA, the wireless path RBD, the wireless path RCA and the wired path REC.

Such user interface 400 includes a graphic illustration of a constellation such that the graphic blocks are connected to each other by using the connection line sections. By using the arrangement described above, the positions of the IP cameras 110A-110E and the image recording host 120 do not need to be moved or changed due to the different network connections. The connection line sections of the user interface 400 can directly illustrate the topology in the local area network. Further, the positions of the connection line sections are certain such that the user interface 400 is easy to be designed.

Figure 5:
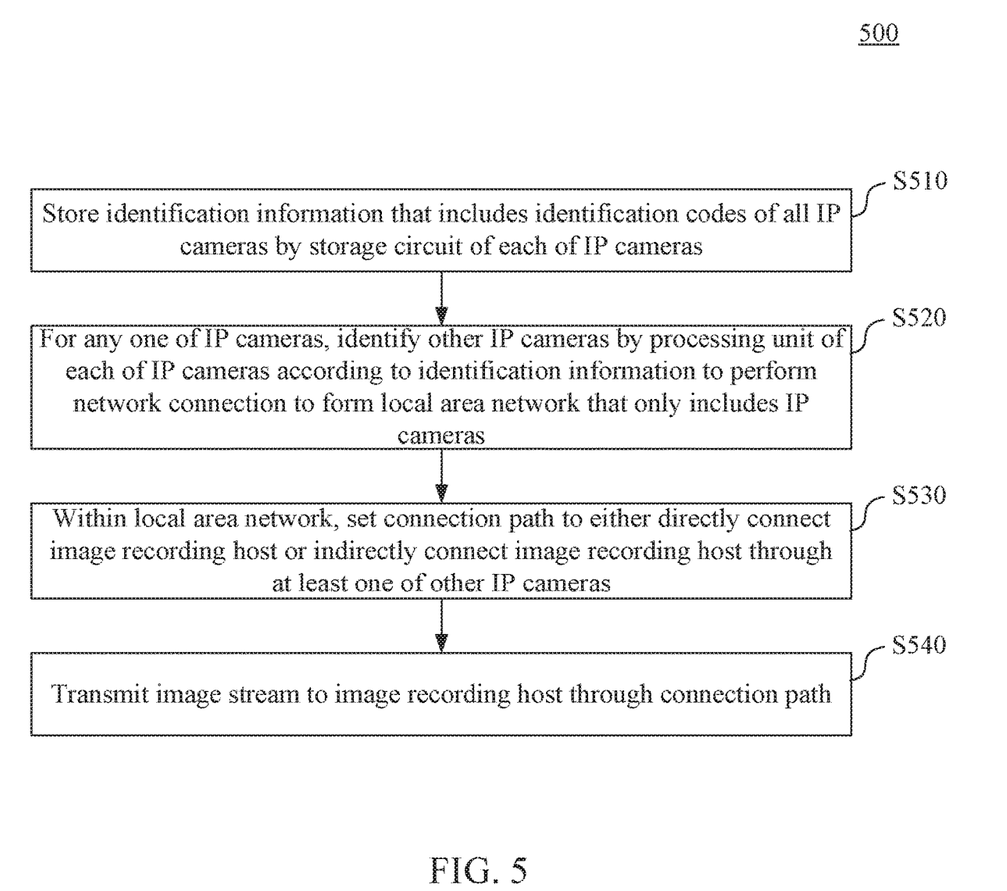
FIG. 5 is a flow chart of an image surveillance system establishing method in an embodiment of the present invention.

Reference is now made to FIG. 5. FIG. 5 is a flow chart of an image surveillance system establishing method 500 in an embodiment of the present invention.

Besides the system described above, the present invention further provides the image surveillance system establishing method 500 that can be use in the IP cameras 110A-110E in FIG. 1 to establish the image surveillance system 100. As illustrated in FIG. 5, an embodiment of the image surveillance system establishing method 500 includes the following steps.

In step S510, the identification information 205 that includes the identification codes IDA-IDE of all of the IP cameras 110A-110E is stored by the storage circuit 200 of each of the IP cameras 110A-110E, wherein each of the IP cameras 110A-110E only corresponds to one of the identification codes IDA-IDE.

In step S520, for any one of the IP cameras 110A-110E, the other IP cameras 110A-110E are identified by the processing circuit 220 of each of the IP cameras 110A-110E according to the identification information 205 of each of the IP cameras 110A-110E by using the communication circuit 210 to perform network connection thereto to form the local area network 130 that only includes the IP cameras 110A-110E.

In step 530, within the local area network 130, the connection path is set by the processing circuit 220 to either directly connect the image recording host 120 or indirectly connect the image recording host 120 through at least one of the other IP cameras 110A-110E by using the communication circuit 210.

In step 540, the image stream (e.g. the image streams ISA-ISE) is transmitted by the processing circuit 210 to the image recording host 120 through the connection path by using the communication circuit 210.

It is appreciated that the embodiments described above are merely an example. In other embodiments, it should be appreciated that many modifications and changes may be made by those of ordinary skill in the art without departing from the spirit of the invention.

In summary, the image surveillance system, the local area network system and establishing method of the same of the present invention keeps the establishing of the image surveillance system from the limitation of the image recording host such that the distribution range is extended. The distribution of the space of the image surveillance system can be more elastic.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. An image surveillance system, comprising:
   an image recording host; and
   a plurality of IP cameras, each comprising:
   a storage circuit configured to store identification information that comprises a plurality of identification codes of all the IP cameras, wherein each of the IP cameras only corresponds to one of the plurality of identification codes;
   a communication circuit configured to perform network communication; and
   a processing circuit electrically coupled to the storage circuit and the communication circuit and configured to execute software and firmware executable commands to execute an image surveillance system establishing method that comprises:
   for any one of the IP cameras, identifying the other IP cameras according to the identification information by using the communication circuit to perform network connection thereto to form a local area network that only comprises the plurality of IP cameras;
   within the local area network, setting a connection path to either directly connect the image recording host or indirectly connect the image recording host through at least one of the other IP cameras by using the communication circuit; and
   transmitting an image stream to the image recording host through the connection path by using the communication circuit.

2. The image surveillance system of claim 1, wherein the image surveillance system establishing method further comprises:
   connecting the other IP cameras through wired paths by using the communication circuit;

broadcasting a self-owned identification code and receiving the identification codes of the other IP cameras to exchange the identification codes by using the communication circuit; and
storing the identification codes as the identification information in the storage circuit.

3. The image surveillance system of claim 1, wherein the image surveillance system establishing method further comprises:
connecting each of the IP cameras to at least one of other IP cameras through a wired or a wireless form by using the communication circuit in the local area network.

4. The image surveillance system of claim 1, wherein the image surveillance system establishing method further comprises:
determining an output IP camera comprised in the IP cameras, wherein the communication circuit of the output IP camera is directly connected to the image recording host;
directly connecting the output IP camera to the recording host by using the communication circuit; and
connecting each of the other IP cameras to the recording host through the output IP camera by using the communication circuit.

5. The image surveillance system of claim 1, wherein the image surveillance system establishing method further comprises:
determining a path to the image recording host in the local area network that has either a largest signal strength, a most stable signal strength or a shortest connection distance to set the path as the connection path.

6. The image surveillance system of claim 1, wherein the image surveillance system establishing method further comprises:
determining that a newly added IP camera is connected to any one of the IP cameras in the local area network in a wired form; and
exchanging the identification codes with the newly added IP camera by using the communication circuit and storing a newly added identification code of the newly added IP camera to the identification information such that the newly added IP camera joins the local area network.

7. The image surveillance system of claim 1, wherein each of the identification codes is a media access control (MAC) address or a chip identification code.

8. The image surveillance system of claim 1, wherein each of the IP cameras is not connected to the image recording host in a wired form.

9. The image surveillance system of claim 1, wherein the image recording host is configured to display a user interface on a display device, and the user interface comprises a plurality of graphic blocks each corresponding to one of the image recording host and the IP cameras and arranged as a closed shaped;
wherein a plurality of connection line sections are disposed among the graphic blocks that illustrate a network connection relation of the IP cameras in the local area network and the network connection relation between the IP cameras and the image recording host.

10. An image surveillance system establishing method comprising:
storing identification information that comprises a plurality of identification codes of all of a plurality of IP cameras by a storage circuit of each of the IP cameras, wherein each of the IP cameras only corresponds to one of the plurality of identification codes;
for any one of the IP cameras, identifying the other IP cameras by a processing circuit of each of the IP cameras according to the identification information of each of the IP cameras by using a communication circuit to perform network connection thereto to form a local area network that only comprises the plurality of IP cameras;
within the local area network, setting a connection path by the processing circuit to either directly connect the image recording host or indirectly connect the image recording host through at least one of the other IP cameras by using the communication circuit; and
transmitting an image stream by the processing circuit to the image recording host through the connection path by using the communication circuit.

11. The image surveillance system establishing method of claim 10, further comprising:
by using the communication circuit, connecting the other IP cameras through wired paths by the processing circuit;
by using the communication circuit, broadcasting a self-owned identification code and receiving the identification codes of the other IP cameras to exchange the identification codes by the processing circuit; and
storing the identification codes as the identification information in the storage circuit by the processing circuit.

12. The image surveillance system establishing method of claim 10, further comprising:
by using the communication circuit, connecting each of the IP cameras to at least one of other IP cameras through a wired or a wireless form in the local area network by the processing circuit.

13. The image surveillance system establishing method of claim 10, further comprising:
determining an output IP camera comprised in the IP cameras by the processing circuit, wherein the communication circuit of the output IP camera is directly connected to the image recording host;
by using the communication circuit, directly connecting the output IP camera to the recording host by the processing circuit; and
by using the communication circuit, connecting each of the other IP cameras to the recording host through the output IP camera by the processing circuit.

14. The image surveillance system establishing method of claim 10, further comprising:
determining a path to the image recording host in the local area network that has either a largest signal strength, a most stable signal strength or a shortest connection distance to set the path as the connection path by the processing circuit.

15. The image surveillance system establishing method of claim 10, further comprising:
determining that a newly added IP camera is connected to any one of the IP cameras in the local area network in a wired form by the processing circuit; and
by using the communication circuit, exchanging the identification codes with the newly added IP camera and storing a newly added identification code of the newly added IP camera to the identification information by the processing circuit such that the newly added IP camera joins the local area network.

16. The image surveillance system establishing method of claim 10, wherein each of the identification codes is a media access control (MAC) address or a chip identification code.

17. The image surveillance system establishing method of claim 10, wherein each of the IP cameras is not connected to the image recording host in the wired form.

18. The image surveillance system establishing method of claim 10, further comprising
- displaying a user interface on a display device by the image recording host, and the user interface comprises a plurality of graphic blocks each corresponding to one of the image recording host and the IP cameras and arranged as a closed shaped;
- wherein a plurality of connection line sections are disposed among the graphic blocks that illustrate a network connection relation of the IP cameras in the local area network and the network connection relation between the IP cameras and the image recording host.

19. A local area network system comprising:
- a plurality of IP cameras each comprising:
  - a storage circuit configured to store identification information that comprises a plurality of identification codes of all the IP cameras, wherein each of the IP cameras only corresponds to one of the plurality of identification codes;
  - a communication circuit configured to perform network communication; and
  - a processing circuit electrically coupled to the storage circuit and the communication circuit and configured to execute software and firmware executable commands to execute an image surveillance system establishing method that comprises, for any one of the IP cameras, identifying the other IP cameras according to the identification information through the communication circuit to perform network connection thereto to form a local area network that only comprises the plurality of IP cameras.

20. The local area network system in claim 19, further comprising a user interface having a graphic illustration of a constellation and having a plurality of connection line sections disposed among a plurality of graphic blocks each corresponding to one of the image recording host and the IP cameras and arranged that illustrate a network connection relation of the IP cameras in the local area network and the network connection relation between the IP cameras and the image recording host to further illustrate a topology of the local area network.

* * * * *